(12) United States Patent
Lakritz et al.

(10) Patent No.: US 11,141,668 B2
(45) Date of Patent: Oct. 12, 2021

(54) PARENT-INFANT-INTERACTIVE, SENSORY-STIMULATION TOY AND METHODS OF USE

(71) Applicant: Yoee Baby LLC, Boulder, CO (US)

(72) Inventors: Jillian Amy Lakritz, Boulder, CO (US); Michael Bruce Lakritz, Boulder, CO (US); William Stanley Donavan, Salida, CO (US); Gregory Allen Smith, Denver, CO (US)

(73) Assignee: Yoee Baby LLC, Boulder, CO (US)

( * ) Notice: Subject to any disclaimer, the term of this patent is extended or adjusted under 35 U.S.C. 154(b) by 184 days.

(21) Appl. No.: 16/657,793

(22) Filed: Oct. 18, 2019

(65) Prior Publication Data
US 2020/0054953 A1    Feb. 20, 2020

Related U.S. Application Data

(63) Continuation of application No. 14/897,008, filed on Dec. 9, 2015, now abandoned.

(51) Int. Cl.
*A63H 3/00*    (2006.01)
*A63H 3/02*    (2006.01)
(Continued)

(52) U.S. Cl.
CPC ........... *A63H 3/003* (2013.01); *A61J 17/1111* (2020.05); *A63H 3/02* (2013.01);
(Continued)

(58) Field of Classification Search
CPC . A63H 3/003; A63H 3/02; A63H 3/16; A63H 3/28; A63H 33/006; G09B 1/00
(Continued)

(56) References Cited

U.S. PATENT DOCUMENTS 1,119,471 A * 12/1914 Taliaferro ................ A63H 3/02
446/370
1,925,895 A *  9/1933 Biber ....................... A63H 9/00
446/370
(Continued)

FOREIGN PATENT DOCUMENTS

CA         2680491         4/2011

OTHER PUBLICATIONS

International Search Report for PCT/US2015/013215; dated Apr. 30, 2015; (three pages).
(Continued)

*Primary Examiner* — Joseph B Baldori
(74) *Attorney, Agent, or Firm* — Terrence M. Wyles, Esq.; Startup IP Law, LLC

(57) ABSTRACT

This disclosure is generally directed to a parent-infant-interactive, sensory-stimulation toy and associated methods of use. Such a toy features an interchangeable elongated feather-like tail member used for gently and playfully stroking a baby's body, wherein the material use for the feather-like member can be made from various types of irresistibly touchable and non-toxic (and preferably hypoallergenic), baby-safe materials of various textures and different sensations. Such materials include, but are not limited to, silks and velvet that are specially configured to provide the desired touch sensory stimulation while eliminating a choking hazard. The toy features a soft and squeezable body member with other graspable appendages and sound-emanating internal components (bells, rattles, crinkle paper, etc.), and the toy as a whole is artistically designed to be visually stimulating to a child, often being fashioned after various animals and/or imaginary characters.

24 Claims, 17 Drawing Sheets

(51) Int. Cl.
   *A63H 3/28* (2006.01)
   *G09B 1/00* (2006.01)
   *A63H 33/00* (2006.01)
   *A61J 17/00* (2006.01)
   *A63H 3/16* (2006.01)

(52) U.S. Cl.
   CPC ............ *A63H 3/16* (2013.01); *A63H 3/28* (2013.01); *A63H 33/006* (2013.01); *G09B 1/00* (2013.01)

(58) Field of Classification Search
   USPC .... 446/71, 72, 227, 297, 369, 370, 371, 373
   See application file for complete search history.

(56) References Cited

U.S. PATENT DOCUMENTS

| | | | |
|---|---|---|---|
| 2,056,090 A | 11/1935 | Burris | |
| 2,510,791 A | 10/1947 | Baggot | |
| 3,460,830 A * | 8/1969 | Barlow | A63F 9/0079 273/440 |
| 3,557,436 A * | 1/1971 | Hodes | A63H 3/04 29/428 |
| 3,899,847 A * | 8/1975 | Dworski | A01K 85/18 43/42.09 |
| 4,208,832 A | 6/1980 | Corriveau | |
| 4,233,775 A * | 11/1980 | Neufeld | A63H 3/04 446/370 |
| 4,610,640 A * | 9/1986 | Amici | A63H 3/18 446/329 |
| 4,756,529 A | 7/1988 | Stillinger | |
| 4,816,002 A | 3/1989 | Brodrib | |
| 4,968,281 A | 11/1990 | Smith et al. | |
| 4,979,924 A * | 12/1990 | Manger | A63H 3/16 428/100 |
| 5,037,343 A | 8/1991 | Benites | |
| 5,205,775 A | 4/1993 | Brodrib | |
| 5,546,620 A | 8/1996 | Matthews | |
| 5,613,317 A * | 3/1997 | Ninegar | A01M 31/06 43/3 |
| 5,640,798 A * | 6/1997 | Garst | A01K 85/00 264/328.1 |
| 5,788,554 A * | 8/1998 | Goodwin | A63H 3/16 446/100 |
| 5,897,420 A * | 4/1999 | Lawrence | A63H 3/16 446/321 |
| 6,065,670 A * | 5/2000 | Mahon | B68B 11/00 231/2.1 |
| 6,623,328 B1 * | 9/2003 | Theel | A01K 15/026 119/707 |
| 6,692,330 B1 | 2/2004 | Kulick | |
| 7,520,793 B2 * | 4/2009 | Pillai | A63H 3/16 446/92 |
| 7,722,428 B2 * | 5/2010 | Di Lullo | A01K 15/025 446/297 |
| 7,841,921 B2 | 11/2010 | Wong et al. | |
| 8,096,457 B1 * | 1/2012 | Manoux | A61B 17/07207 227/175.1 |
| 8,137,150 B2 | 3/2012 | Oestreicher | |
| 8,591,283 B2 * | 11/2013 | Hahn | A63H 3/46 446/330 |
| 10,172,670 B2 * | 1/2019 | Stewart | A61B 17/29 |
| 2003/0068955 A1 * | 4/2003 | Vick | A63H 3/003 446/369 |
| 2004/0077277 A1 | 4/2004 | Choi | |
| 2005/0101220 A1 | 5/2005 | Jackson | |
| 2005/0170742 A1 | 8/2005 | Oestreicher | |
| 2007/0054593 A1 * | 3/2007 | Santos | A63H 3/003 446/369 |
| 2007/0254555 A1 * | 11/2007 | Johnson | A63H 3/46 446/369 |
| 2008/0090490 A1 | 4/2008 | Barrows et al. | |
| 2008/0196676 A1 | 8/2008 | Kim et al. | |
| 2008/0305712 A1 * | 12/2008 | Kazakoff | A63H 3/02 446/370 |
| 2010/0048088 A1 * | 2/2010 | Cardinale | A63H 3/02 446/98 |
| 2011/0209261 A1 * | 9/2011 | Lyle | A63H 33/006 2/49.1 |
| 2012/0073032 A1 | 3/2012 | Tigan et al. | |
| 2013/0288567 A1 * | 10/2013 | Blue | A63H 3/02 446/369 |
| 2014/0194034 A1 | 7/2014 | Castaneda | |
| 2014/0370779 A1 * | 12/2014 | Simonds | A63H 3/02 446/369 |
| 2015/0231515 A1 * | 8/2015 | Vilardo | A63H 3/16 446/321 |
| 2015/0273349 A1 * | 10/2015 | Falotico | A63H 9/00 428/542.4 |
| 2015/0290546 A1 * | 10/2015 | Alves | A63H 3/36 446/369 |
| 2016/0158112 A1 * | 6/2016 | Summers | A63H 3/003 446/73 |

OTHER PUBLICATIONS

Written Opinion of the International Searching Authority for PCT/US2015/013215; dated Apr. 30, 2015; (four pages).

* cited by examiner

PARENT-INFANT-INTERACTIVE, SENSORY-STIMULATION TOY AND METHODS OF USE

CROSS-REFERENCE TO RELATED APPLICATIONS

This patent application is a Continuation of, and claims the priority benefit of, U.S. patent application Ser. No. 14/897,008, filed on Dec. 9, 2015 for "Parent-Infant-Interactive Sensory-Stimulation Toy and Methods of Use." which is the U.S. National-Stage Entry, and claims the priority benefit of, of Patent Cooperation Treaty Application No. PCT/US2014/013215, filed on Jan. 28, 2015 for "Parent-Infant-Interactive Sensory-Stimulation Toy and Methods of Use," which in turn claims the priority benefit of U.S. Provisional Patent Application No. 61/939,702; filed on Feb. 13, 2014 for "Parent-Infant-Interactive. Sensory-Stimulation Toy and Methods of Use."

In addition, this patent application hereby incorporates by reference each of U.S. patent application Ser. No. 14/897,008; Patent Cooperation Treaty Application No. PCT/US2014/013215; and U.S. Provisional Patent Application No. 61/939,702 in their entirety for all purposes.

BACKGROUND

Developmental studies indicate that sensory stimulation is an effective exercise for increasing the number of brain cell connections in infants and toddlers.

"Touch is a powerful learning tool for enhancing a baby's early emotional learning."
Alice Sterling Honig, PhD. Infants & Toddlers. The Power of Sensory Experiences "Touch is a very important sense that has been found to affect parent-infant attachment, cognitive development, sociability, ability to withstand stress, and immunological development . . . touch enhances growth and development"
Cindy McGaha, Associate Professor of Child Development, Published in Focus on Infants & Toddlers. Fall 2003. Vol. 16, #1

Further, the Harvard Center on the Developing Child has stated that the first year of a child's life is a crucial time for the development of the brain, as depicted in FIG. 5.

As can be seen from the Harvard Center Study results in FIG. 5, a baby's brain undergoes its most explosive period of development during the child's first six months of life. Caring responsive interactions in the early months are vital to both individual and societal outcomes. Those interactions shape neural pathways in the brain, which lead to better educational outcomes, which in turn helps enable society to fulfill the demands for a strong economy. Early nurturing experiences affect the development of brain architecture.

While the market is saturated with toys that are meant to stimulate the senses, these are typically static playthings. At best, a parent can use the toy to make noises as the baby looks, listens, and maybe bats at it with their arms. Typical examples are baby rattles, mobiles, etc. Particularly for infants, there are few toys that actually promote the interaction between parent and child.

For example, a parent can give a baby a rattle, perhaps even rattling the device in front of the baby's face initially to get the baby's interest, then watch the baby shake it or chew on it. However, there really are few opportunities for ongoing direct interaction between the parent and the baby with the rattle, and a parent is likely to tire of holding the rattle, and while the parent is holding the rattle, the baby is not getting the full benefit of the sensory-development of the rattle, other than the sound when the parent shakes it, and of course the visual aspects of the rattle. Parents, and in particular mothers, often find themselves placing their infant in a baby seat or laying the infant on a play mat and then relying of the static toys to engage and stimulate the child. In such cases, significant opportunities to both enhance the sensory and cognitive development of the infant and promote the early loving and interactive bond between parent and child are lost. Parents looking for something more interactive are forced to rely on Do-It-Yourself (DIY) sensory-development activities because there are few devices/toys that can fully fill these needs.

For example, BABY CENTER® suggests collecting a variety of soft, touchable, household objects; such as a silk scarf, feather boa, or swatch of velvet; and brushing such items gently across a baby's tummy, hands, and feet:

From BABY CENTER® "Let's Play":
"What a Sensation
"Your baby wants to experience everything up close and personal, and she does that through all five senses, particularly touch. Encourage her curiosity and tactile talents with this soothing touch-fest.
"Appropriate for: Newborn to 10 months
"Skills developed: Hand-eye coordination, touch sensitivity
"What you'll need: A variety of soft-textured items, such as a silk scarf, a clean feather duster or boa, a piece of satin or velvet, and something furry like a stuffed animal
"Collect an assortment of soft, touchable household objects. With your baby lying on her back on a blanket, take off her shirt and give her tummy a sampling of the different textures. One at a time, brush each item ever so gently across her skin, describing the sensation as you go. "Feel the silky scarf? It's very slippery. Feel the lamb? It's fuzzy, isn't it?" When she's older she'll try to grab the items—go ahead and let her hold them, or (if you're sure they're clean and don't pose a choking concern) even put them in her mouth."

However, having the right, baby safe stimuli on hand is often a real challenge for parents. Few parents have clean 'swatches' of silk and/or velvet just lying around their house. Most Parents do not have the time to collect the needed materials to support such activities, and such materials will necessarily be expendable because of the inevitable baby spit-ups on the materials and other maintenance issues when leaving such materials lying with an infant. In addition, random materials not properly prepared can result in a danger to a baby, including choking dangers if left alone with a swatch of material.

What is needed in the art is a hybrid tool and toy that turns certain materials into a soft and safe feather-like texture for application to a baby and combines that "feather" feature with other interactive features to stimulate the various senses in a baby, while being easy for a parent to hold and gently and playfully interact with the baby during use.

BRIEF SUMMARY

The present inventive disclosure is generally directed to a multi-functional, parent-infant-interactive, sensory-stimulation toy and associated methods of use. Such a toy combines various senses-stimulation members that can be found in some other child toys; however, it also features a very soft, elongated, feather-like tail member (in some embodiments, interchangeable) used for gently and playfully stroking a baby's body, wherein the material use for the feather-like member can be made from various types of irresistibly touchable and non-toxic (and preferably hypoallergenic and/or organic), baby-safe materials of various textures and different sensations) such as silks, velvet, polyesters, and/or cottons that are specially configured to provide the desired touch sensory stimulation while eliminating a choking hazard.

In many embodiments, the toy features a soft and squeezable body member, and the toy as a whole is artistically designed to be visually stimulating to a child, often being fashioned after various animals and/or imaginary characters. In many variations, the feather-like tail member is fashioned into a long, flexible-yet-stiff "tail" associated for the character that the toy is modeled after.

The toy is designed to stimulate emotional and sensory growth in infants, and to spark a very joyful connection between the parent and the young child filled with giggles, smiles, and coos. For example, the toy's tail member is designed to promote sensory development, cognitive development, body awareness, and fine and gross motor skills. The overall aesthetic design of the toy often employs enchanting characters that are made from contrasting patterns to grab a baby's attention. The toy's body member can also employ internal devices to create bell sounds, rattling sounds, and/or crinkle sounds (typically with CPSIA and/or EN-71 compliant crinkle material, often called crinkle paper or baby paper), depending on the variation, in order to stimulate and delight youngster's ears, and can also have a teething ring attached to the bottom of the body member in order to help soothe a baby's irritated gums.

In many embodiments, the toy has a soft, flexible, handhold member adapted to snuggly and comfortably engage a parent's hand/fingers such that the toy's front character face can be presented to an infant without the parent's hand/fingers interfering with the visual presentation.

To use the toy in many embodiments, a parent needs to simply grab the soft handle on the back side of the toy's body member, then gently caress the baby's face, neck, body, arms, hands, legs, or feet with the tail to elicit positive feedback from the baby (e.g., a smile, giggles, cooing, etc.). Overall, the toy provides:

A fun, playful, and engaging activity involving self-directed play, and child-directed interactivity between the parent and baby;

Enhanced self-awareness of the baby's own body, sensory and cognitive development, and the development of both fine and gross motor skills;

Language and cognitive development; and

Enhanced interaction and bonding between the parent and the baby, leading to enhanced social-interaction skills and a joyful shared experience for both baby and parent.

The foregoing Brief Summary is intended to merely provide a short, general overview of the inventive disclosure described throughout this patent application, and therefore, is not intended to limit the scope of the inventive disclosure contained throughout the balance of this patent application, including its appended claims and drawings.

DETAILED DESCRIPTION

I. Terminology

Figure 1A:
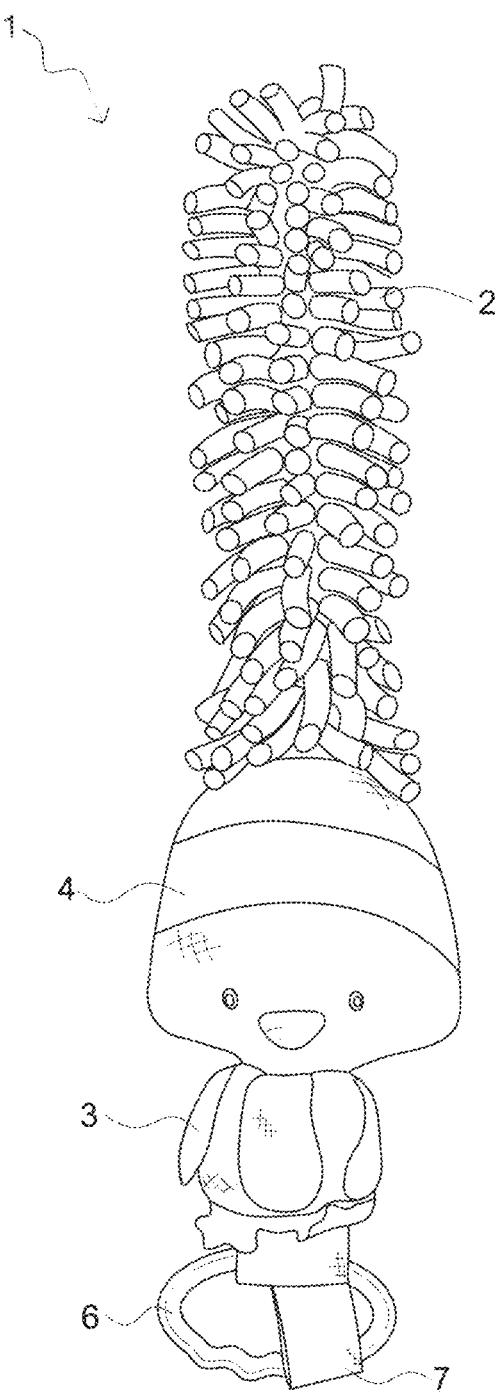
FIGS. 1A-1F depict the front, rear, right-side, left-side, top, and bottom views of one embodiment of a parent-infant-interactive, sensory-stimulation toy.
Figure 1B:
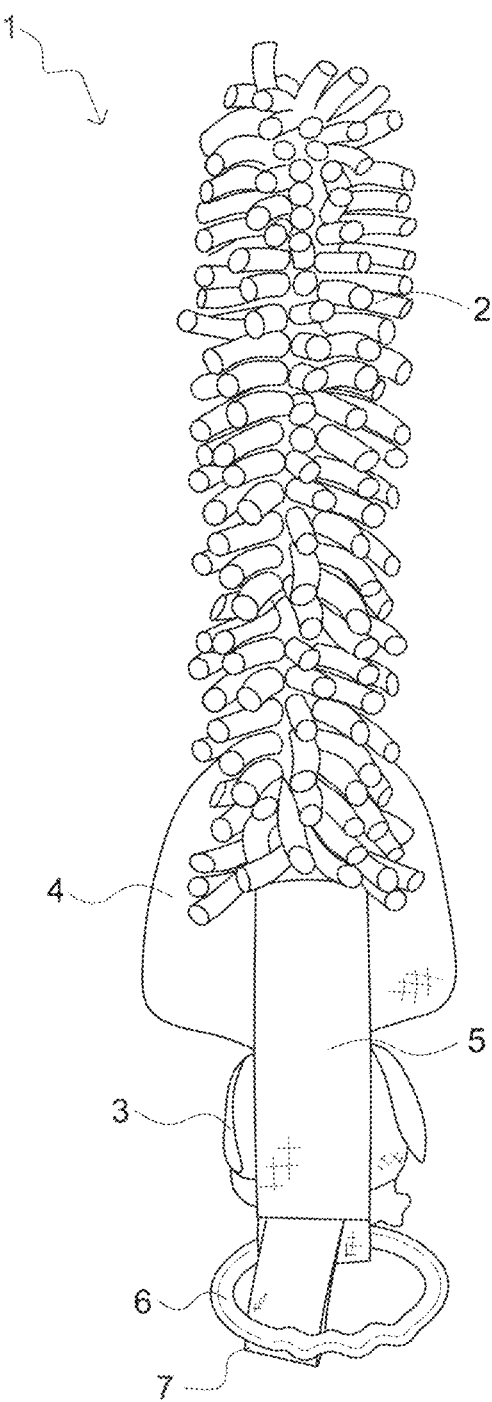
Figure 1C:
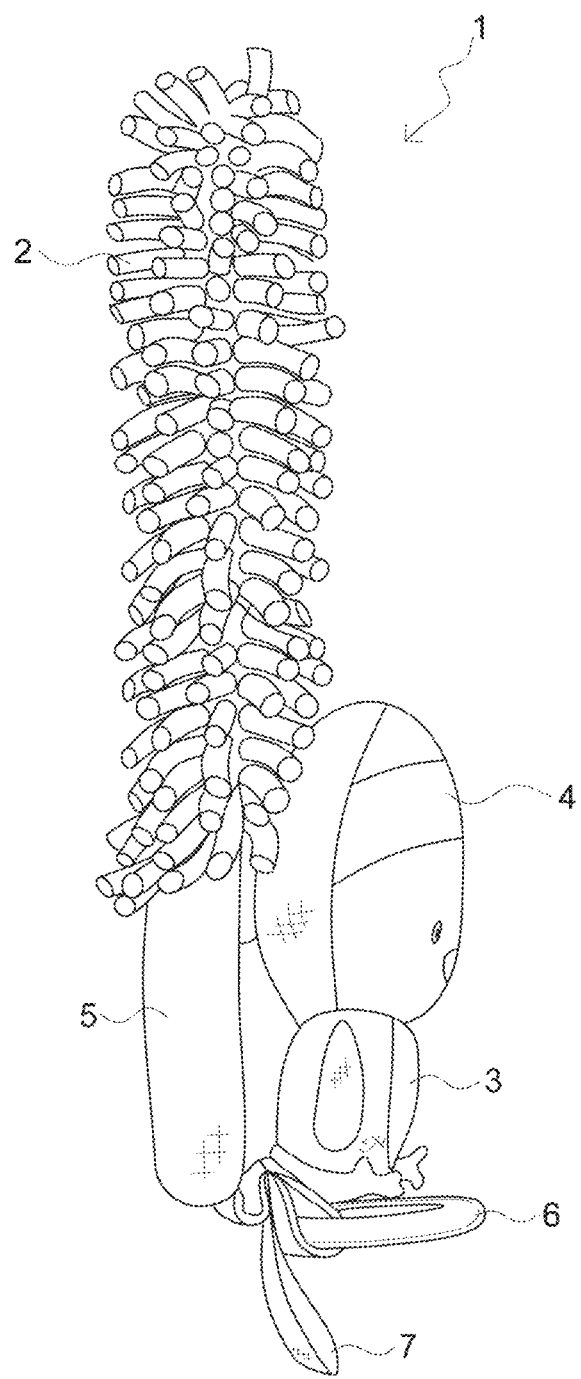
Figure 1D:
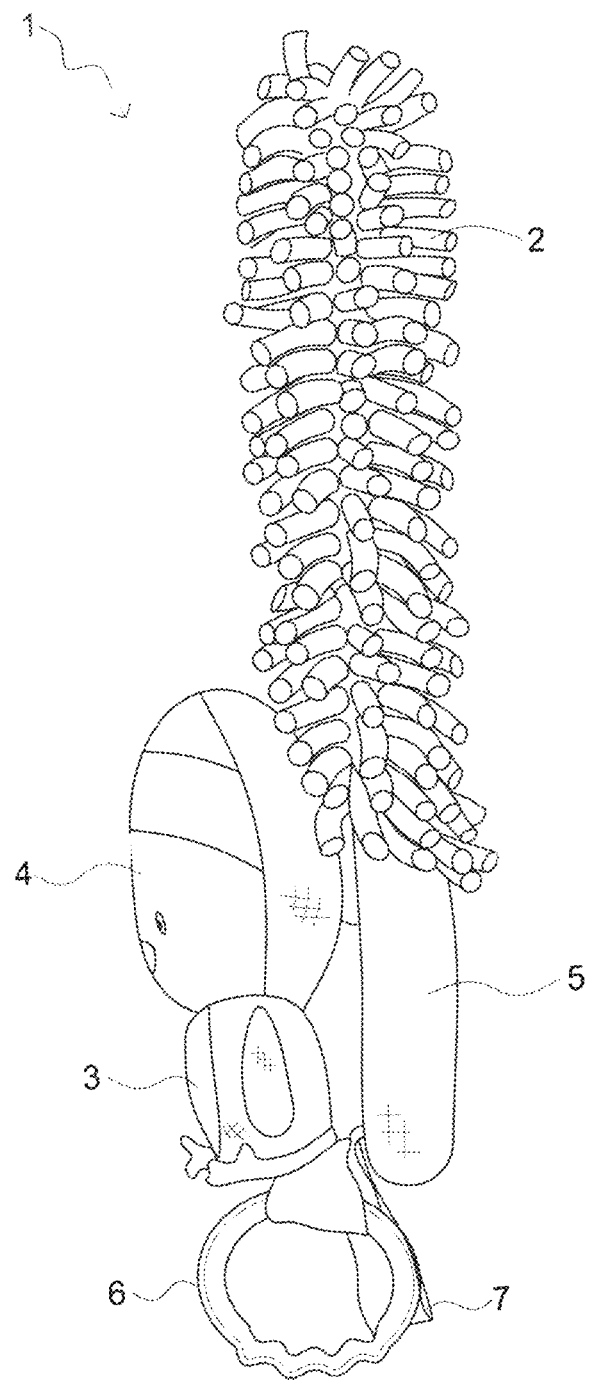
Figure 1E:
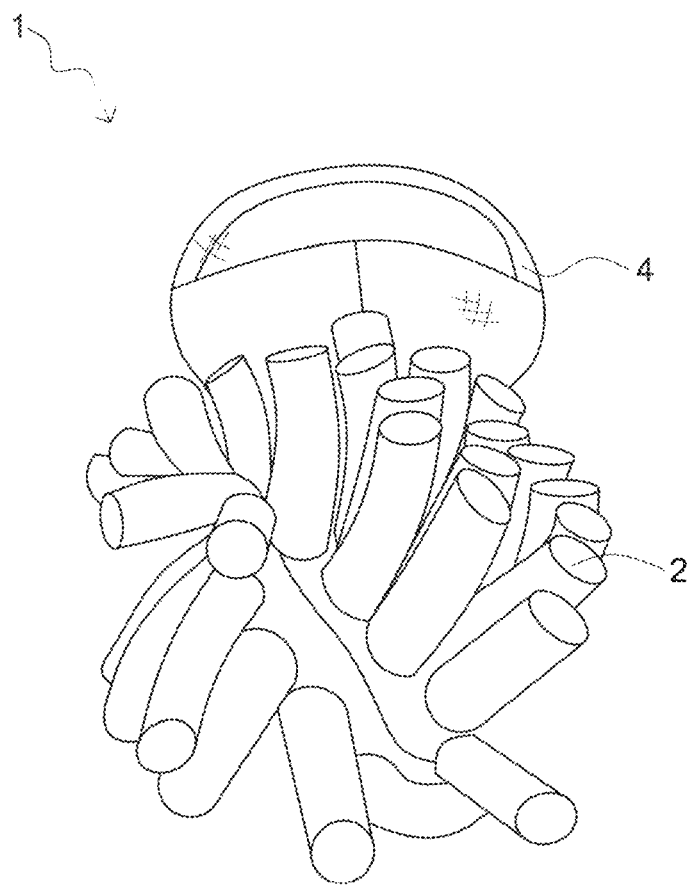
Figure 1F:
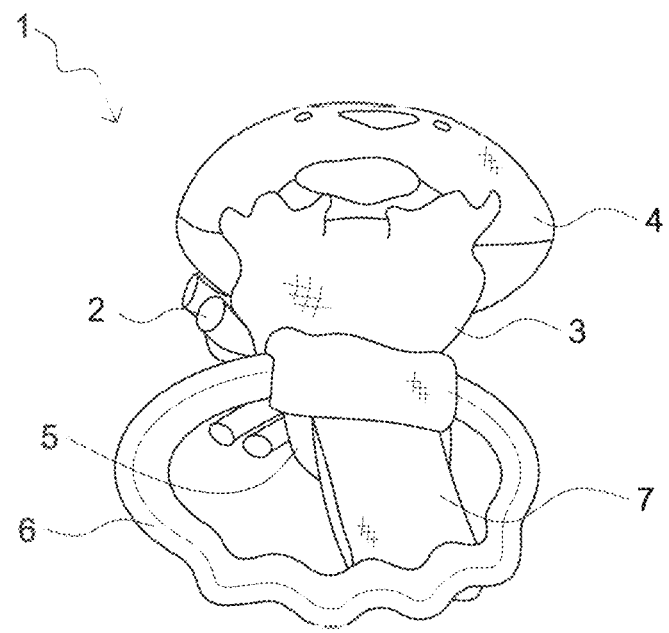
Figure 1G:
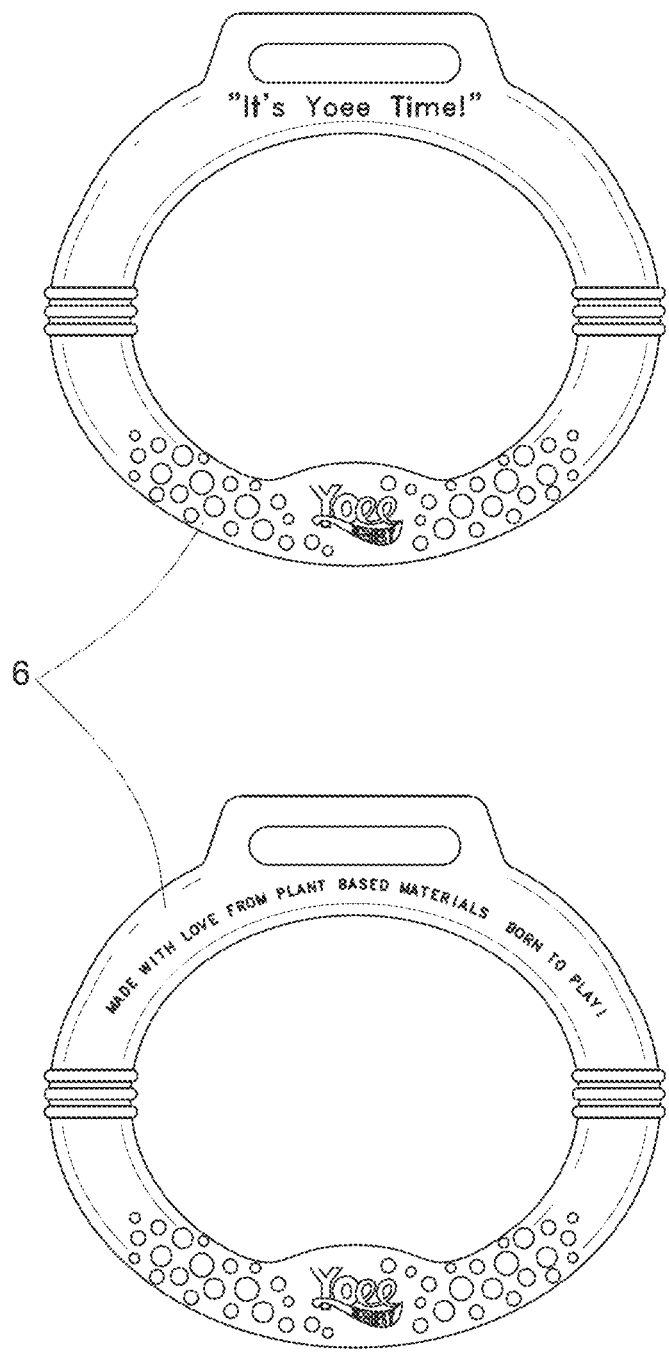
FIG. 1G depicts one embodiment of the front and rear views of a teething ring that is adapted to be connected to the bottom of the parent-infant-interactive, sensory-stimulation toy depicted in FIGS. 1A-1F.

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", "detachably coupled", and similar terms, as used in this specification (including the claims and drawings), refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, and lateral are relative to each other, are dependent on the specific orientation of an applicable element or article, are used accordingly to aid in the description of the various embodiments, and are not necessarily intended to be construed as limiting in this specification and the appended claims.

As applicable, the terms "about" or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "baby safe", "child safe", "infant safe", or similar term, as used in this specification (including the claims and drawings), means compliant with applicable government and/or industry safety standards such as regulations under the U.S. Consumer Product Safety Improvement Act [CPSIA] or European Standard EN-71. As much as possible, "baby-safe" materials are preferably bisphenol A (BPA) free.

The term "feather-like, tail member" and similar terms, as used in this specification (including the claims and drawings), means the tail portion of the parent-infant-interactive, sensory-stimulation toys described herein that features various materials of varying textures and softness to act like the vanes, afterfeather, and/or downy-barb portions of an actual feather from a bird. Said feather-like, tail member" also features a long (relative to the toy body) flexibly rigid internal "spine" portion over which the feather-like material is disposed and can also include a "handle" portion in direct communication with the "feather-like" part of the tail member.

The term "parent", "child caregiver", and similar terms, as used in this specification (including the claims and drawings), means any person(s) acting to care for and teach an infant, as described in the various methods of use provided herein.

II. A Multi-Functional, Parent-Infant-Interactive, Sensory-Stimulation Toy

The disclosure in this Section II is generally directed to a multi-functional, parent-infant-interactive, sensory-stimulation toy. In this Section, all reference numbers for toy components refer to those in the exemplary embodiment shown in FIGS. 1A-1L, but can be applied to other embodiments as well.

Figure 3A:
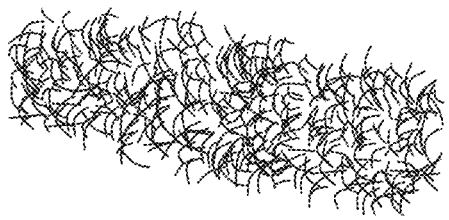
FIGS. 3A-3G depict various examples of materials (but not intended to be limited to these examples) that can be used to make the feather-like tail member on a parent-infant-interactive, sensory-stimulation toy. Said depicted materials are: "silky shag" (FIG. 3A). "silky fringe" (FIG. 3B), "microfiber chenille" (FIG. 3C), "Muppet shag" (FIG. 3D). "thick yarn" (FIG. 3E), "thin/fine yarn" (FIG. 3F), and "cut stretch velvet" (FIG. 3G).
Figure 3B:
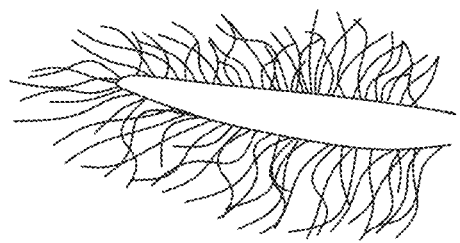
Figure 3C:
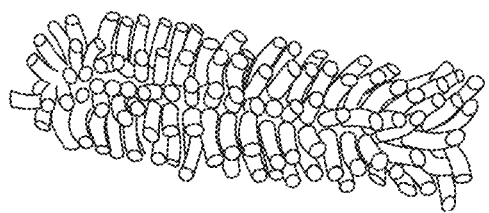
Figure 3D:
Figure 3E:
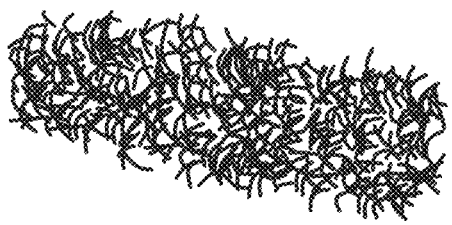
Figure 3F:
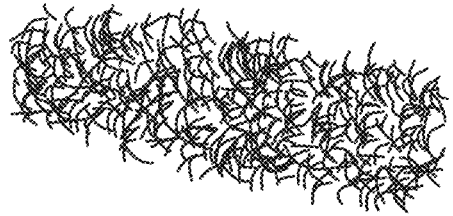
Figure 3G:
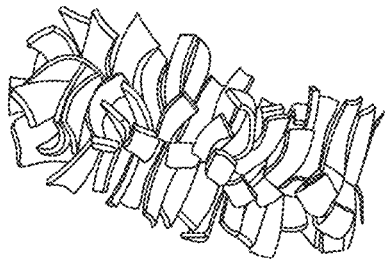
Figure 4A:
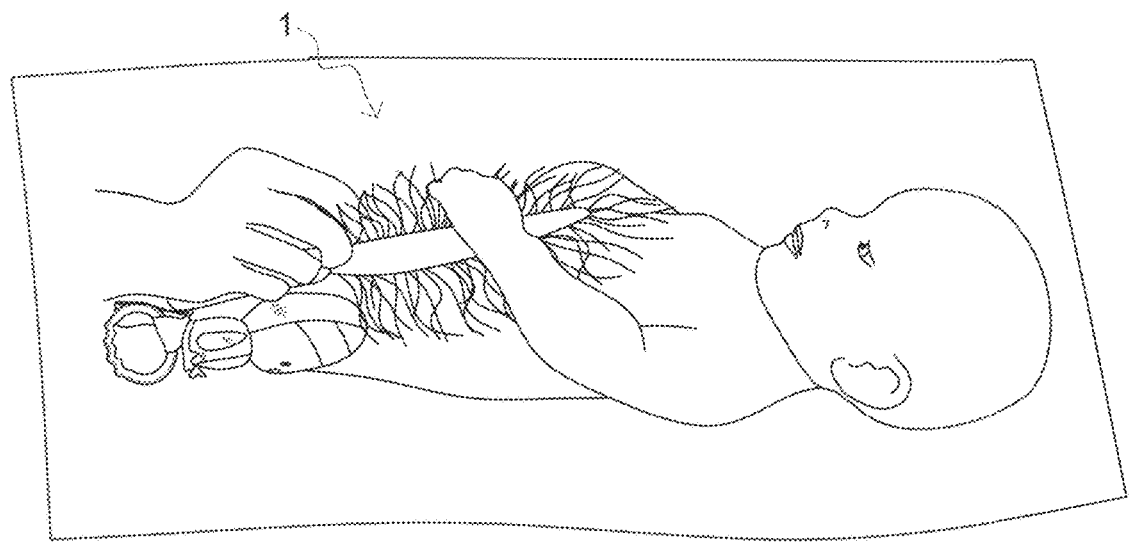
FIGS. 4A-4B each depicts an embodiment of a use of a parent-infant-interactive, sensory-stimulation toy.
Figure 4B:
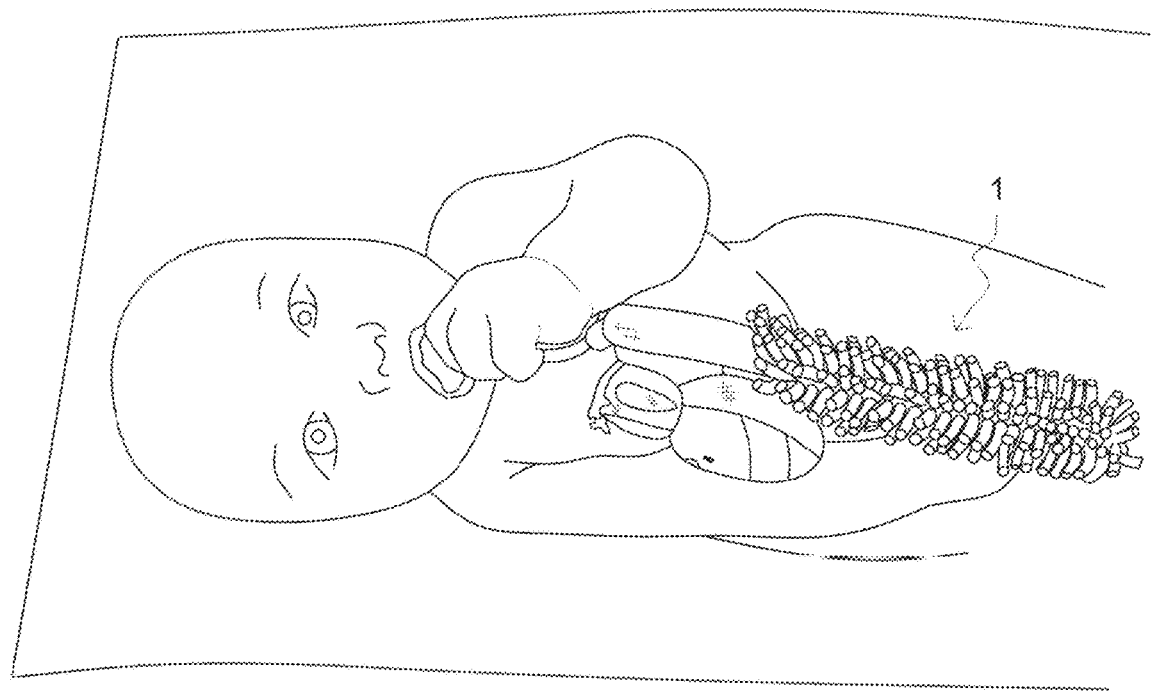
Figure 5:
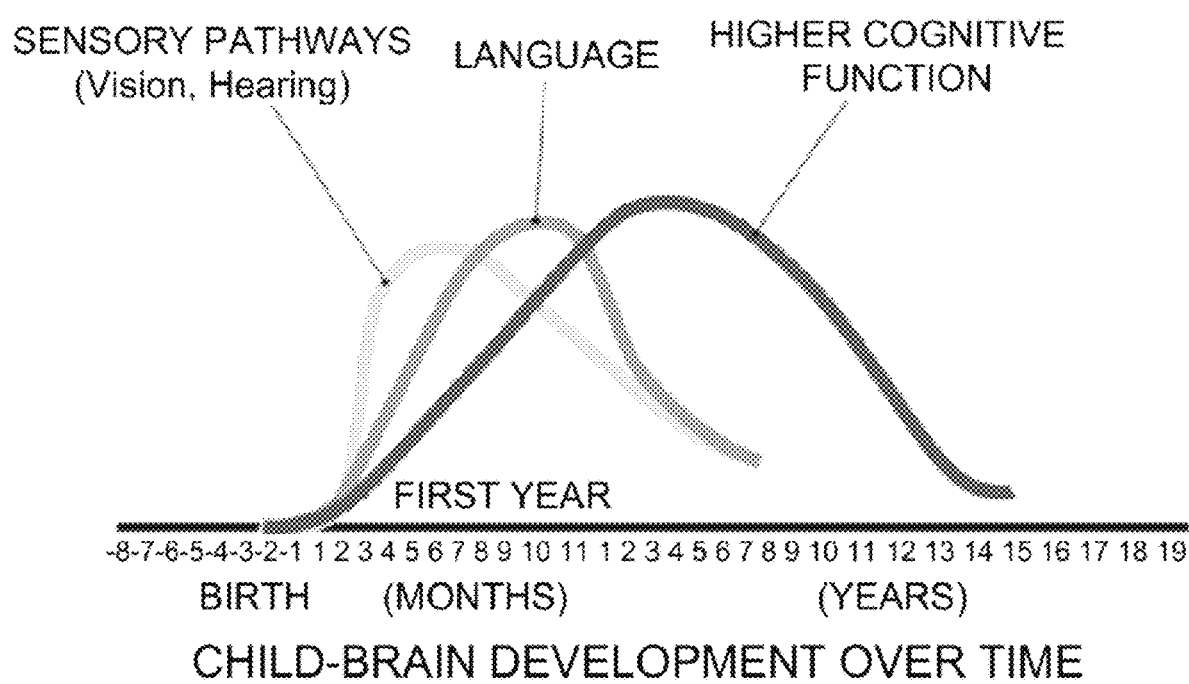
FIG. 5 provides a graphical depiction of the results of a study by the Harvard Center on the Developing Child, which shows how a child's brain develops over childhood, with an emphasis on the development of vision and hearing sensory pathways and language capabilities over the 12 months immediately after birth. Higher cognitive functionality is more developed in subsequent years.

Such a toy 1 features a very soft, feather-like, tail member 2 used for gently and playfully stroking a baby's body, wherein the material use for the feather-like tail member 2 can be made from various types of irresistibly touchable and non-toxic fabrics (and preferably hypoallergenic and/or organic) such as satins, silks, velvet, polyesters, and/or soft cottons that are specially configured to provide the desired touch sensory stimulation while eliminating a choking hazard. See FIGS. 3A-3G for examples of materials that can be used for the feather-like tail member 2. The depicted materials are, respectively: "Silky shag" (FIG. 3A), "silky fringe" (FIG. 3B). "microfiber chenille" (FIG. 3C), "Muppet shag" (FIG. 3D), "thick yarn" (FIG. 3E), "thin/fine yarn" (FIG. 3F), and "cut stretch velvet (FIG. 3G). However, these example materials are not intended to be considered a limiting list of possible materials; for example, any number of satins or satin-like materials could also be used. Of course, in some variations, actual large semi-plume feathers may be used for the tail member 2. In various embodiments, the toy 1 is artistically designed to be visually stimulating to a child and is fashioned after various animals and/or imaginary characters (see, e.g., FIGS. 2A-2H). In many variations, the feather-like member 2 is fashioned into a long, flexible-yet-stiff "tail" associated for the character that the toy 1 is modeled after, and usually is configured to extend higher than the body member 3, 4. However, other tail member 2 configurations are used in some embodiments as well, such as a circular, ring-like "tail".

In an embodiment, the feather-like tail member 2 is caused to be substantially straight/stiff, yet flexible by an internal-frame member 2A (also referred to as a "core" or "spine") made of a light-weight and somewhat rigid material (rigid enough to hold the tail upright, while still allowing much flexing and minimizing the potential poking hazards). Numerous materials can be used to construct a flexibly rigid spine for the feather-like tail member 2. In one variation, the material used for the flexibly rigid spine 2A is 30 Shore A silicone rubber. Such internal tail-member 2 core materials could also be a plastic stick, a rolled-paper stick (similar to a candy sucker stick), a foam stick, or a molded-rubber stick. Other materials could be considered as long as they do not compromise safety and meet the criteria stated above. In some embodiments, stuffing/filler material (e.g., polyester fill material, high-density foam, natural shredded rubber, etc.) can be used in the feather-like tail member 2 instead of, or in addition to, the internal-frame member 2A to provide the flexible stiffness needed for the feather-like tail member 2. In still more embodiments, instead of having a soft irresistibly touchable fabric covering the upper part of the tail member 2, a plurality of firm-yet-squishable and rotatable balls or rollers made of a rubbery or resilient foam material are disposed over the structure of said tail member 2 such that the balls/rollers can be used to roll across a baby's body (similar to a massager).

Figure 1H:
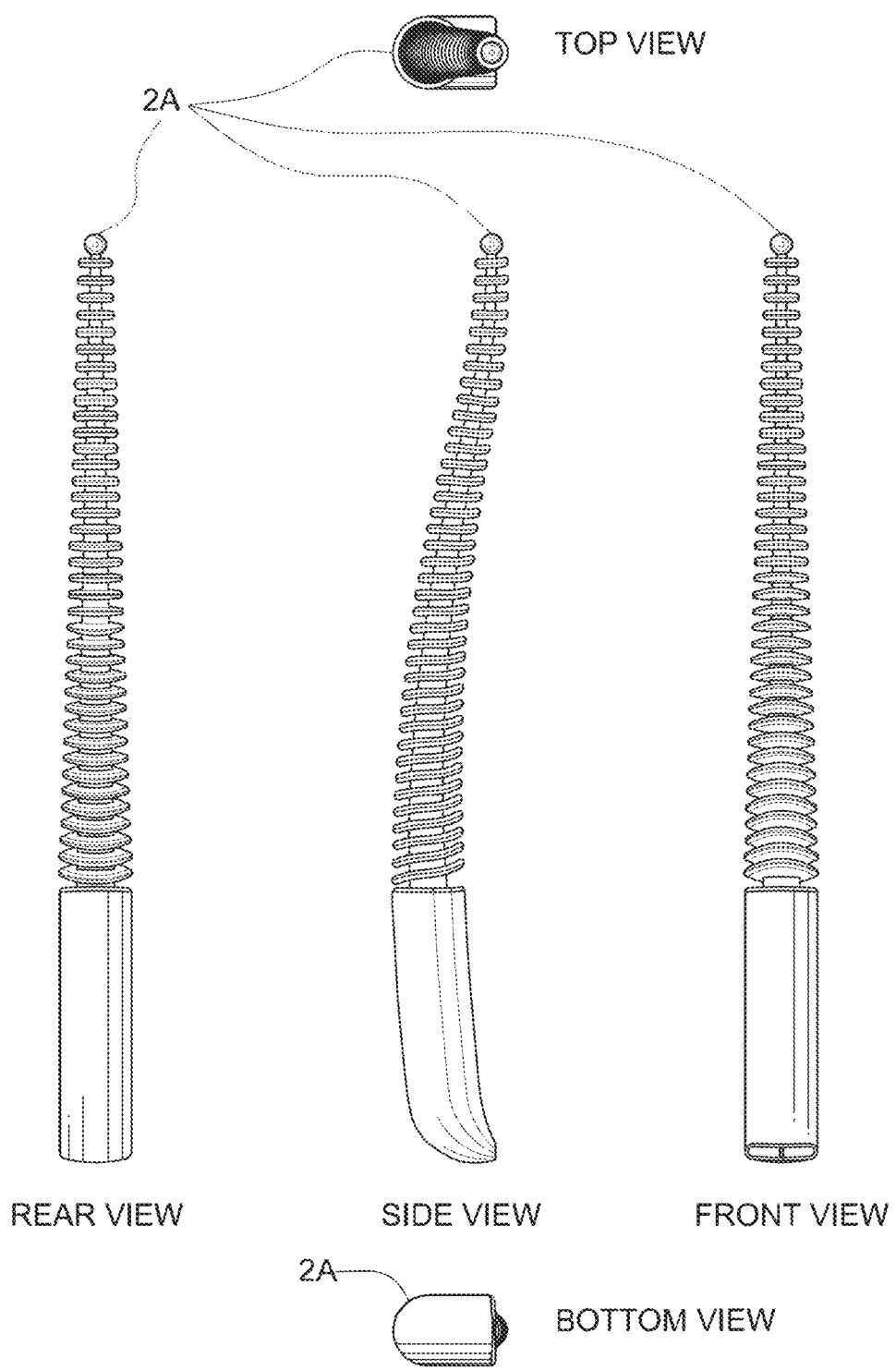
FIGS. 1H-1I depict one embodiment of an internal flexible "spine" disposed in the interior of the feather-like, tail member of the parent-infant-interactive, sensory-stimulation toy depicted in FIGS. 1A-1F.
Figure 1I:
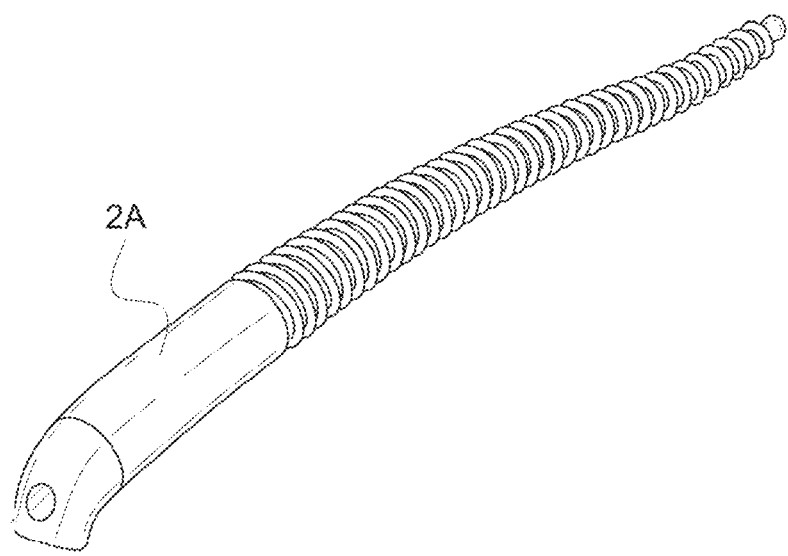

Referring to a variation of the spine 2A in FIGS. 1H-1I, the spine 2A comprises a solid base portion that is thicker than the top portion of the spine 2A, with the spine 2A usually tapering-down in thickness from said base to the top end. Typically, in some variations, a plurality of thin "ribs" are disposed along most of the length of the spine 2A, above the aforementioned base portion, with said ribs essentially being radial extensions of spine material (often shaped like circular discs) from the tapered core spine 2A and decreasing in size/radius as the top of the spine 2A is approached. Besides providing a structure for the feather-like materials (see, e.g., FIGS. 3A-3G) to be placed on, the spaces between the plurality of ribs allows for greater flexing of the feather-like tail member 2 when in use since the core of the spine 2A will be thinner. Further, in some cases, the spine 2A is not merely straight, but is slightly curved or bent in a subtle single-wave pattern as viewed from the side, and/or some of the ribs may be skewed/tilted up on one side, in order to provide a more-realistic tail look-and-feel and action.

Figure 1J:
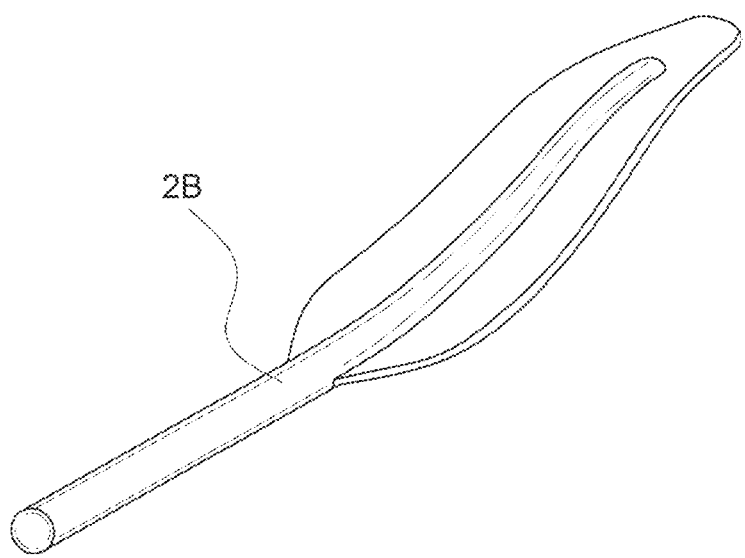
FIG. 1J depicts an alternate embodiment of an internal flexible "spine" disposed in the interior of the feather-like, tail member of the parent-infant-interactive, sensory-stimulation toy depicted in FIGS. 1A-1F.
Figure 1K:
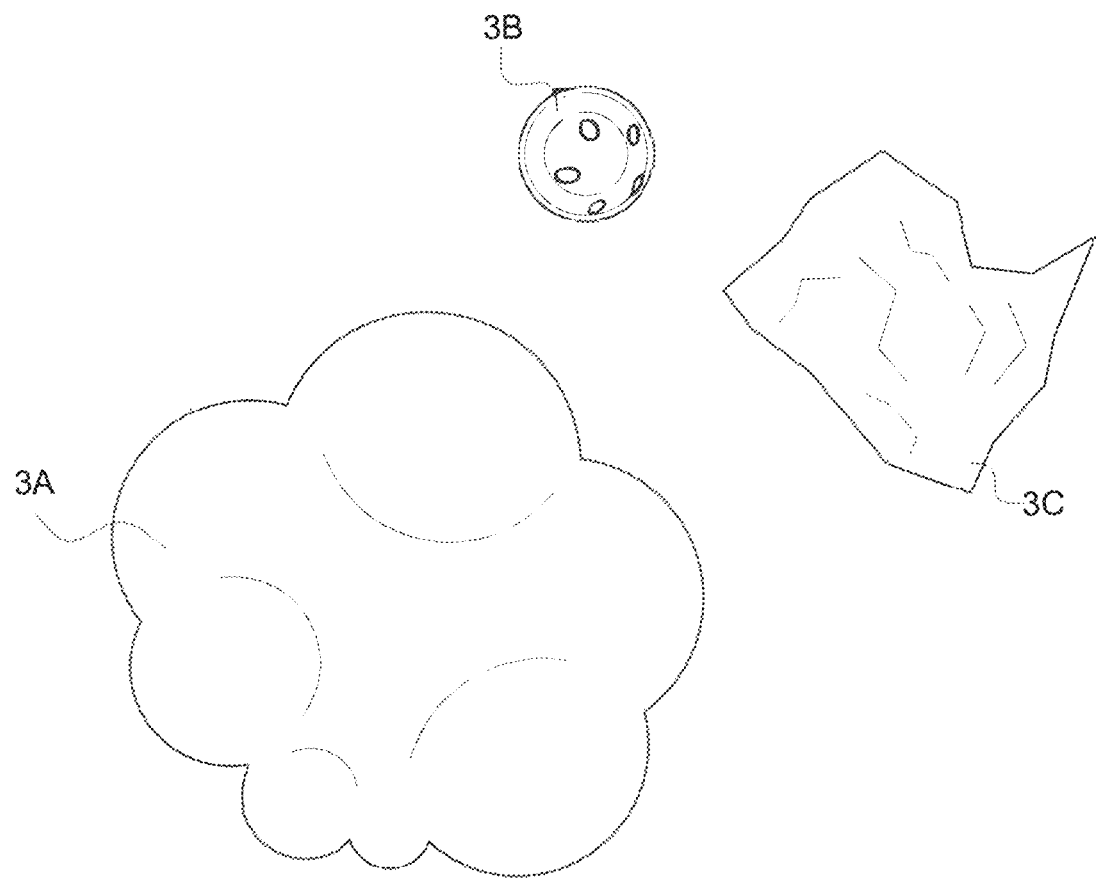
FIG. 1K depicts one embodiment of several common internal components of the body and/or head members (including in some variations, some appendages such as arms and legs) of the parent-infant-interactive, sensory-stimulation toy depicted in FIGS. 1A-1F. Said internal components include a "jingle ball" sewn into the interior, "crinkle material" (also called "crinkle paper"), and stuffing, and all said internal components are designed to be baby-safe (e.g., complies with applicable government-prescribed safety standards, such as the regulations under the U.S. Consumer Product Safety Improvement Act [CPSIA] or European Standard EN-71).
Figure 1L:
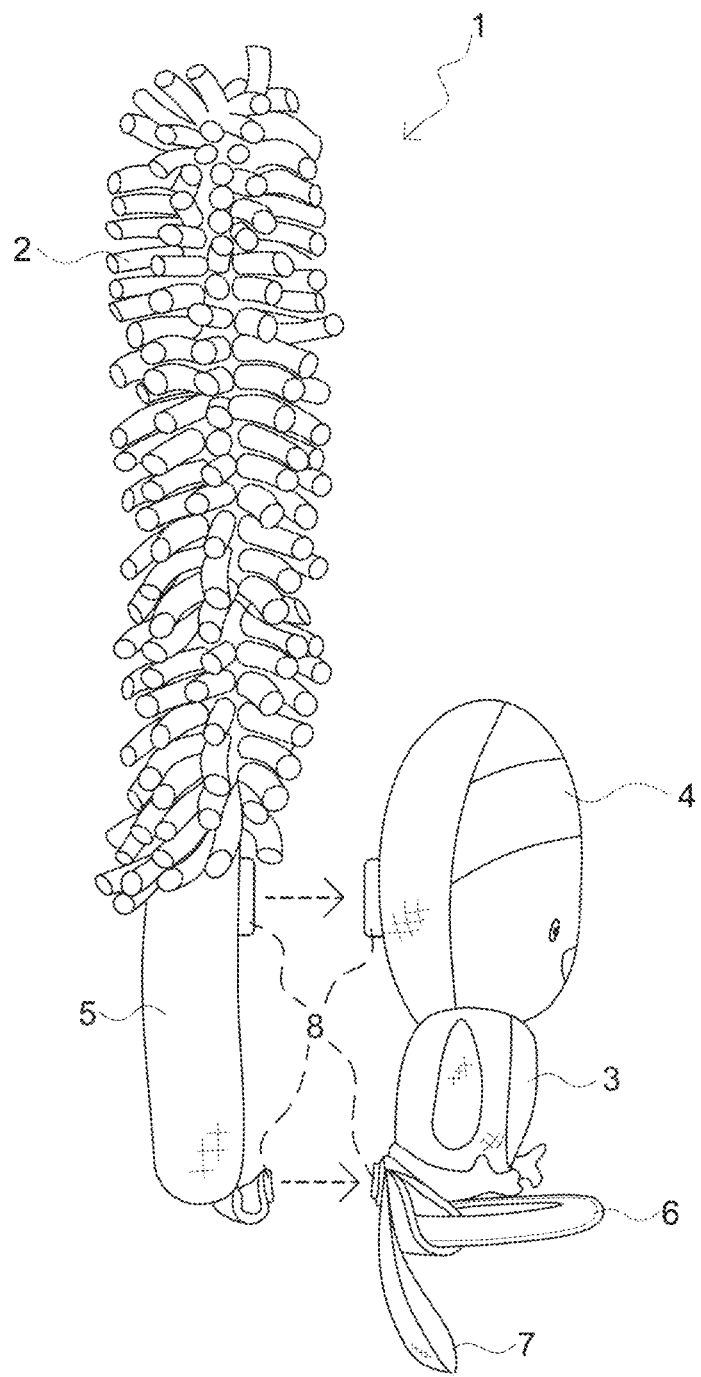
FIG. 1L depicts one embodiment of the parent-infant-interactive, sensory-stimulation toy depicted in FIGS. 1A-1F, wherein the feather-like, tail member and handle assembly is detachable and reattachable to the main body/head of the toy. This feature also allows for a user to attach different tail members to the body of the toy.
Figure 2A:
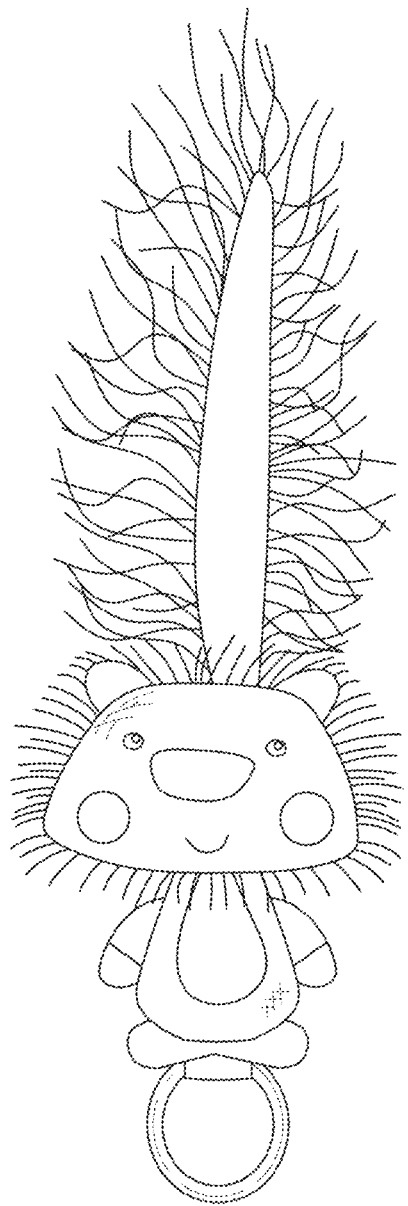
FIGS. 2A-2H depict various example "characters" (but not intended to be limited to these examples) that can be used to embody a parent-infant-interactive, sensory-stimulation toy.
Figure 2B:
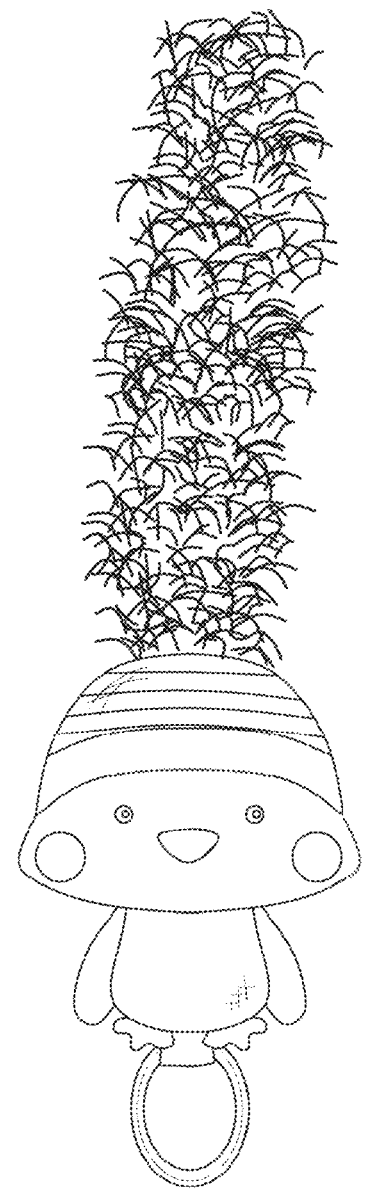
Figure 2C:
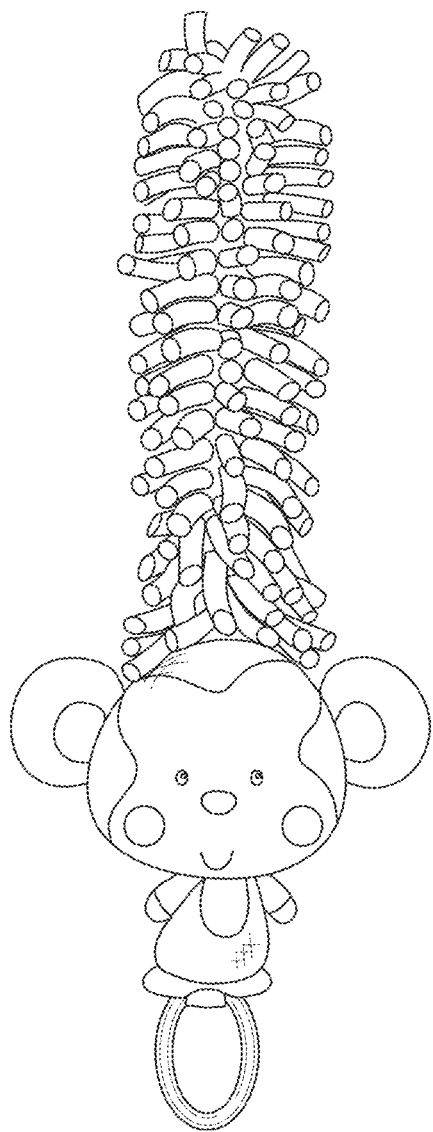
Figure 2D:
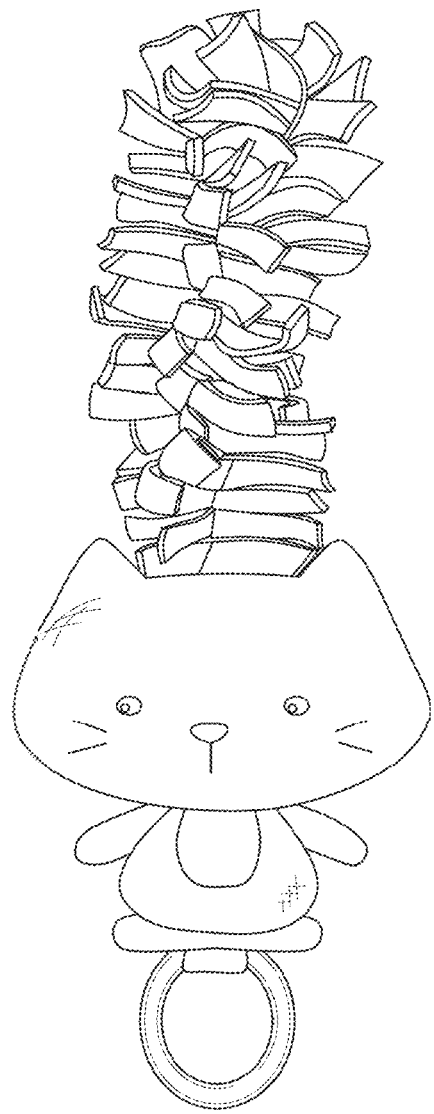
Figure 2E:
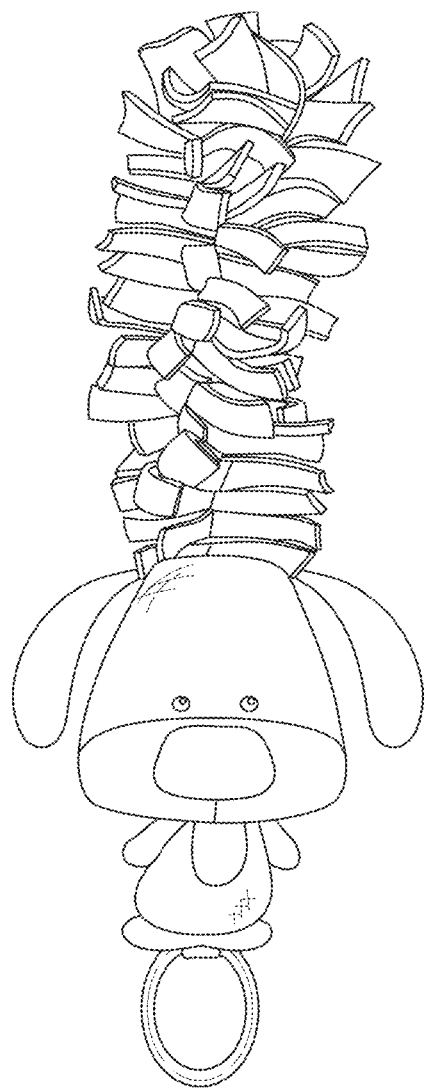
Figure 2F:
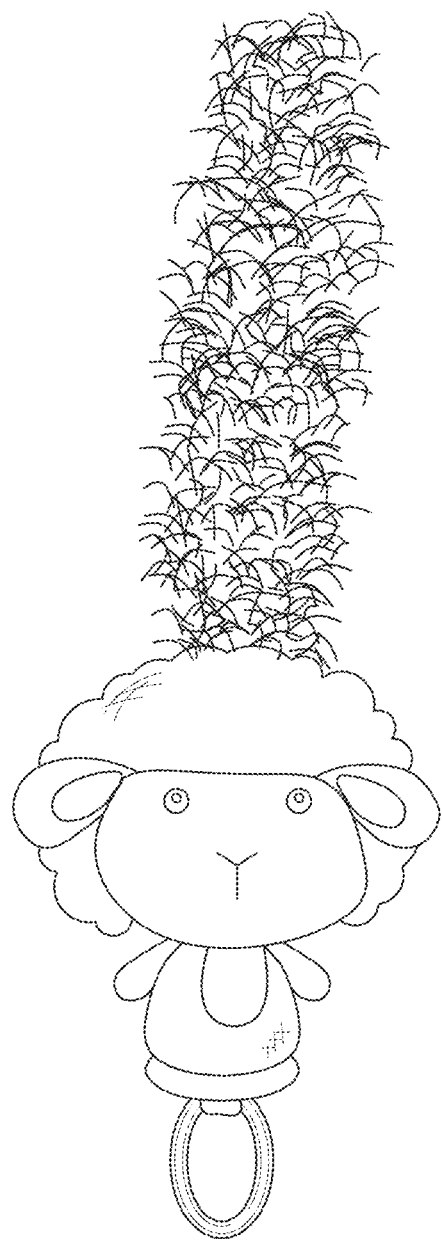
Figure 2G:
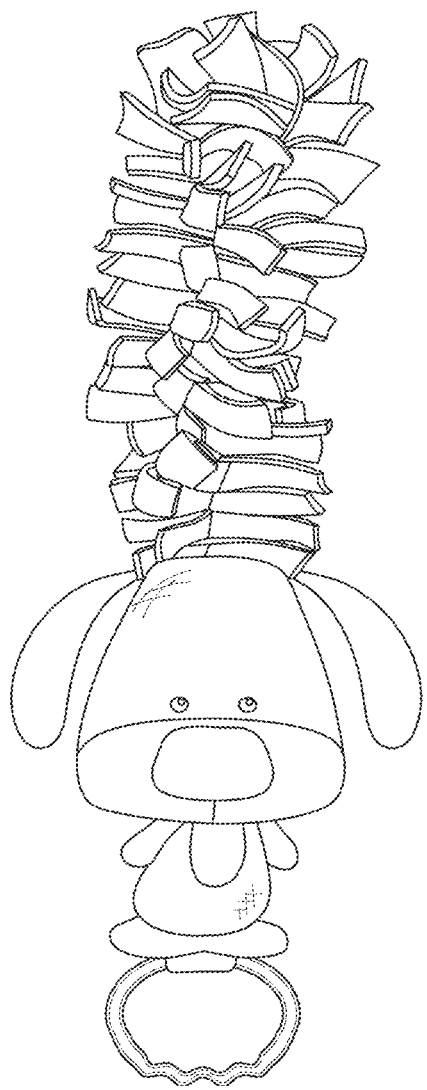
Figure 2H:
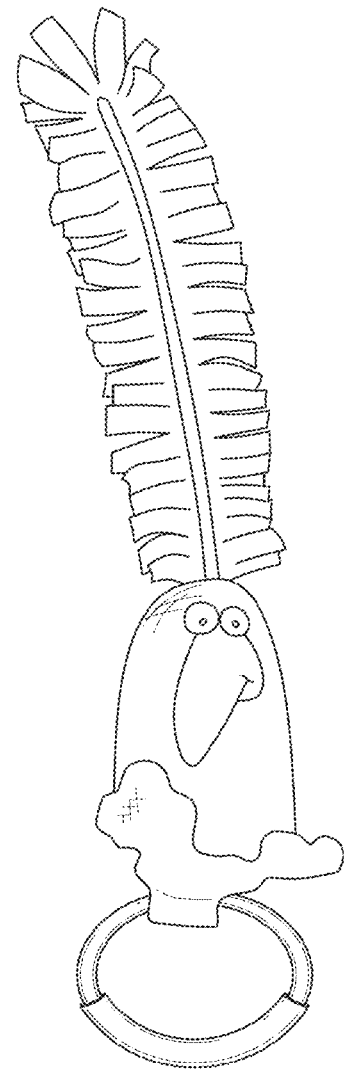

However, in some variations, the tail member 2 can have an internal structural member that causes the tail member 2 to have other engaging shapes, such as circles, triangles (inverted or otherwise, etc.), so long as the tail member 2 extends substantially above the body member 3, 4 in order to better facilitate the baby-stroking activities described herein. One such variation of the internal spine 2B is depicted in FIG. 1J.

In other variations, the tail member 2 is detachably coupled 8 (see FIG. 1L) to the body member 3, 4 of the toy 1 to facilitate the changing of the tail member 2 with a new tail member 2 for the purpose of either changing the look of the toy 1, changing the feel/texture of the toy 1, and/or simply replace a part of the toy 1 that has been worn out, damaged, or rendered unsanitary by excessive chewing, etc. In variations, the detachable coupling 8 is accomplished by a means selected from the group comprising hook-and-loop coupling, magnetic coupling, or mechanical-snap coupling.

In many embodiments, the main "body" 3, 4 of the toy 1 is made from soft fabrics (also preferably hypoallergenic and/or organic) sewn and containing baby-safe filler materials that make the body member 3, 4 resilient and squeezable by both parent and young child. In addition, in many preferred embodiments, the body member 3, 4 (and possibly associated appendages) houses a noise/sound-causing member 3B, 3C, such as a mechanical bell, an internal rattle/jingle bell 3B, a squeaker device, and/or with crinkle material 3C, often called crinkle paper or baby paper (that make a "crinkly" sound when manipulated). While preferred embodiments avoid the use of electronic devices, it is nevertheless contemplated that some variations will include a self-contained electronic member that can emit various programmed sounds (e.g., animal sounds, funny speaking voices, bouncy/springy sound effects, etc.) and/or power programmed light-emitting-diode (LED) lighting effects visible on the exterior of the toy 1, and perhaps electronic touch sensors to actuate such preprogrammed sounds and/or LED lighting effects. Importantly, in preferred embodiments, any internal components of the body member 3, 4 are "baby safe" (that is, comply with all applicable regulatory safety standards. For example, any internal noise/sound-causing member 3B, 3C are preferably sized to meet the standards of 16 CFR § 1501 (U.S. Small-Parts Regulations) just in case the covering of the toy 1 is breached somehow, making internal components available to a child. In addition, in many variations, discrete internal components are sewn into the material of the body 3, 4 and/or are contained in their own sack that in turn is fixedly attached to the material of the body 3, 4.

The filler material 3A is likewise non-toxic (and preferably hypoallergenic and/or organic) so that the toy, if found lying around by a child or pet is safe. The filler material 3A can be of any filler materials that are standard in industry for pillows and stuffed animals, including synthetic and/or natural materials. Such filler materials 3A can include polyester (e.g., polyester fiberfill), polyester pellets, microbeads, polystyrene pellets, foam of various types known in the industry, down feathers, wool, natural shredded rubber, or various other seed or plant matter. In some embodiments, the filler material 3A is aromatic; for example, a portion of the filler material can be comprised of plant matter such as lavender or any other pleasing scent that does not elicit allergic reactions for a parent or the parent's baby. In still more variations, the body member 3, 4 contains an interchangeable scent-producing member to allow a parent to change the smells presented to the parent's child.

In preferred embodiments, the filler material 3A is selected and prepared in sizes such that the risk of choking on the filler material 3A by a child is minimized, should the outer material structure of the body member 3, 4 be breached for some reason.

In some embodiments, the body member 3, 4 has a soft, flexible, and cushiony handle member 5 fixedly attached to the back of the body member 3, 4 to allow a parent to snuggly and comfortably slip in his or her fingers in order to hold the toy 1 in a way to present the full front of the "character" of the toy 1 to the infant without having to squeeze the body member 3, 4. In addition, the handle member 5 allows a parent to more-easily and gently stroke the baby with the feather-like tail member 2. One end of the handle member 5 is fixedly attached to the upper-rear of the body member 3, 4, near where the tail member 2 is attached to the body member 3, 4, and the other end of the handle member 5 is fixedly attached toward the lower-rear of the body member 3.

The toy 1 is typically aesthetically configured to resemble an animal or character of some sort, often involving many colors, patterns, and textures on the body member 3, 4 and on the tail member 2. Accordingly, in many embodiments, the body member 3, 4 has various extra appendages attached to form things such as a discrete head 4, ears, arms/hands, legs/feet, eyes, antennae, etc.

In other variations of the toy 1, a teething ring 6 is attached proximal to the bottom portion of the body member 3. In some versions, the teething ring 6 can be readily changed-out for a new one (e.g., via material strips containing hook-and-loop coupling), perhaps of different looks and texture. In many cases, the teething ring 6 is comprised of a baby-safe material (since it is expected to be chewed on), such as plant-based or food-based polyethylene or ethylene propylene copolymer. Similarly, in other variations, a satin (or other smooth, easy-to-clean fabric) tag 7 is often fixedly coupled to the body member 3. Besides providing a space for branding, the tag 7 is designed to be long-enough to be enjoyed as a favorite play item for a baby (a baby's typical fascination with product tags as is well-known by parents everywhere), which is just one additional feature on the toy 1 to help keep the baby engaged.

The toy's 1 size and manufacturing materials can vary from embodiment to embodiment; however. Table 1 provides an example of one embodiment of the toy-component sizes, which is not intended to limit the dimensions of all other embodiments:

TABLE 1

Typical Toy Dimensions

| Dimension | Ideal Prototype Size |
|---|---|
| Length of Handle Member | 3.0"-3.25" |
| Width of Handle Member | 1.0"-1.5" |
| Distance from Top of Handle Member to Top of Tail Member | 8.0"-10.0" |
| Top of Head to Top of Tail Member | 6.5"-8.5" |

TABLE 1-continued

Typical Toy Dimensions

| Dimension | Ideal Prototype Size |
|---|---|
| Top of Head to Base of Toy | 4.25"-5.0" |
| Height from Base of Toy to Top of Tail (including fabric loft) | 11.25"-13.0" |

III. A Method of Use of a Parent-Infant-Interactive, Sensory-Stimulation Toy The disclosure in this Section III is directed to methods of use of the embodiments of a parent-infant-interactive, sensory-stimulation toy ("toy" 1) described herein this patent application. In this Section, all reference numbers for toy components refer to those in the exemplary embodiment shown in FIGS. 1A-1L and 4A-4B, but can be applied to other embodiments as well.

The goal for using the toy is to stimulate growth and spark a magically joyful connection between parent and infant filled with giggles, smiles, and coos, as well as to promote a baby's sensory development, cognitive development, language development, body awareness, and fine and gross motor skills.

The activities using the toy 1 can create incredible moments of joy for both baby and parent and result in a sense of accomplishment for a parent eager to foster baby's development:

Soft sensations, like a feather, make a baby smile and coo.
This kind of activity results in an intimate moment of bonding between parent and child, and is an activity that a parent and baby can do together.
This kind of activity is play with a purpose; that is, the parent is actively engaged in doing something that is both pleasurable and good for baby's development.

In an embodiment, a method of using the toy 1 comprises the steps, taken by the parent, of:

Get comfortable, then lay baby (in either a supine, prone, or side position) on a soft blanket on the floor, on a bed, or any substantially flat surface.
Grab the handle member 5 of the toy 1 and gently caress the baby's face, body, hands, arms, legs, feet, and/or belly with the tail member 2.
Talk to the baby. Tell the baby what you are doing in order to introduce the baby to new words by describing every detail of your playtime.
When baby is ready, let the baby hold the toy 1 on his or her own. Encourage the baby to touch, grasp, and explore the toy 1 with all of the baby's senses.

In variations of this embodiment, the method is directed to enhancing a baby's body awareness by further comprising the steps, taken by the parent, of:

Touch various body parts of the baby with the tail member 2 of the toy 1.
As each baby body part is touched with the tail member 2, verbally name the body part.
As each body part is named and touched, describe how each body part is connected (e.g., "Your toes are connected to your feet.").

In more variations of this embodiment, the method is directed to enhancing a baby's language development by further comprising the steps, taken by the parent or a baby caretaker, of:

Narrate everything being done as the toy 1 is interacting with the baby.

For example:
"This is a [insert animal name]."
"What sound does a [insert animal name] make?"
"What color is the animal?"
"How does this feel?"
"These are your toes, your tummy, and your cheeks."
"This feels [soft, smooth, bumpy, etc.]"

In even more variations of this embodiment, the method is directed to enhancing a baby's sensory stimulation and development by further comprising the steps, taken by the parent, of:

Cause touch sensation by caressing the baby with the toy's 1 tail member 2, or let the baby hold and explore the Tail member's 2 multi-textured fabrics on the baby's own.
Create visual stimulation by introducing the toy's 1 contrasting patterns and colors.
Cause audio stimulation by actuating the toy's 1 noise-making capabilities; e.g., shake the toy 1 body member 3, 4 to cause an internal mechanical bell or rattle 3B to emanate noise, and/or squeezably manipulate the body member 3 to cause an internal squeaker to emit noise or to cause internal crinkle paper 3C to make "crinkly" sounds.

In still additional variations of this embodiment, the method is directed to enhancing a baby's fine and gross motor skills by further comprising the steps, taken by the parent, of:

Let the baby play with and try to grasp the toy's 1 soft tail member 2, handle member 5, and teething ring 6.
Place the toy 1 just out of reach of the baby as an incentive to roll over, crawl, or push-up during "tummy time".

In event more variations of this embodiment, the method is directed to enhancing the interaction and boding between a parent and the baby by further comprising the steps, taken by the parent, of:

Look into the baby's eyes, then smile, respond, and let the baby know you're present.
Use the toy 1 to demonstrate cause and effect, e.g., "When I touch your belly, it feels soft and tickley."
Bond with baby by sharing giggles, smiles, and coos together as the toy 1 creates reactions from the baby.

IV. A Multi-Functional, Parent-Infant-Interactive, Sensory-Stimulation Toy

The disclosure in this Section IV is generally directed to a multi-functional, parent-infant-interactive, sensory-stimulation toy designed to facilitate the interaction between an infant and the infant's caregiver and for causing sensory stimulation in an infant. In this Section, all reference numbers for toy components refer to those in the exemplary embodiment shown in FIGS. 1A-1L, but can be applied to other embodiments as well.

The multi-functional, parent-infant-interactive, sensory-stimulation toy 1 comprises: a body member 3, 4, said body member 3, 4 comprised of a fabric exterior containing a filler material 3A that renders said body member 3, 4 soft and resilient, said body member 3, 4 having a front side and a back side; and a flexibly stiff tail member 2 attached to the back side of said body member 3, 4, wherein: said tail member 2 extends higher than said body member 3, 4, said tail member 2 has a flexible handle member 5 disposed on one end for holding by a user, and said tail member's 2 exterior surface comprised of soft and flexible materials to present a synthetic feather-like texture.

This embodiment can be enhanced wherein the toy 1 further comprises at least one appendage on said body member 3, 4 adapted to facilitate the ability of an average infant to grasp.

This embodiment can be enhanced wherein the toy 1 further comprises at least one noise-making capability 3B, 3C. In variations, said at least one noise-making capability 3B, 3C is caused by a member selected from a group comprised of a mechanical bell, a jingle bell member, an internal rattle, a squeaker device, a with CPSIA-compliant crinkle material, a EN-71-compliant crinkle material, and an electronic device with speaker capable of emitting programmed sounds.

This embodiment can be enhanced wherein said tail member 2 exterior surface is substantially comprised of a fabric selected from a group comprised of satin, silk, velvet, silky shag, silky fringe, microfiber chenille, Muppet shag, thick yarn, thin yarn, fine yarn, soft cotton, and cut stretch velvet. See, e.g., FIGS. 3A-3G. In variations, other materials can be used. In other embodiments, said tail member 2 exterior surface is substantially comprised of at least one semi-plume feather.

This embodiment can be enhanced wherein the toy's 1 tail member 2 has an internal spine structure 2A that is comprised of a flexibly stiff member 2A that is selected from the group consisting of a 30 Shore A silicone rubber, plastic stick, a rolled-paper stick, a foam stick, and a molded rubber stick. FIGS. 1H-1J show two examples of possible spine structures 2A, 2B. In variations, said internal spine structure 2A comprises a core spine that has a plurality of rib structures separated from each adjacent rib by a space along the longitudinal axis of said core spine, wherein said plurality of rib structures decrease in diameter size toward the top of said spine structure to form a tapered spine structure from bottom to top. (See FIGS. 1H-1I.) In still more embodiments, said spine structure 2A deviates from a straight line by incorporating at least one curvature along the length of said spine structure 2A. (See FIGS. 1H-1I.) In some variations, stuffing/filler material (e.g., polyester fill material, high-density foam, natural shredded rubber, etc.) can be used in the feather-like tail member 2 instead of, or in addition to, the internal-frame member 2A to provide the flexible stiffness needed for the feather-like tail member 2.

This embodiment can be enhanced wherein the toy's 1 materials are hypoallergenic. In variations, some or all of said toy 1 materials are organic.

This embodiment can be enhanced wherein the toy 1 further comprises a light-emitting-diode-based (LED-based) lighting display capability.

This embodiment can be enhanced wherein said filler material 3A for said body member 3, 4 is selected from a group comprised of polyester, polyester fiberfill, polyester pellets, microbeads, polystyrene pellets, foam, down feathers, wool, natural shredded rubber, seeds, and plant matter. In variations, at least some of said filler material 3A is scented. In yet additional variations, said scented filler material 3A is interchangeable with new filler material 3A of other types or scents. In further enhancements, the toy 1 comprises an interchangeable scent-producing member 3A disposed in said body member 3, 4.

This embodiment can be enhanced wherein said handle member 2 is fixedly attached on each end of said handle member 2 to the rear side of said body member 3, 4.

This embodiment can be enhanced said tail member 2 is detachably coupled 8 to said body member 3, 4 such that said tail member 2 can be changed out for a different type of tail member 2 or for a differently ornamented tail member 2 or such that said tail member 2 can be used independently from the remainder of the toy 1 (similarly, the body 3, 4 of the toy 1 could be used independently from the tail member 2). In variations, said detachable coupling 8 is accomplished by a means selected from a group comprised of hook-and-loop coupling, magnetic coupling, and mechanical-snap coupling.

This embodiment can be enhanced wherein said toy 1 is aesthetically configured to resemble an animal.

This embodiment can be enhanced wherein said toy 1 further comprises a teething ring 6, said teething ring 6 coupled to said body member 3, 4. In variations, said teething ring is detachably coupled to said body member 3, 4 to allow for the change-out with a new teething ring 6.

This embodiment can be enhanced wherein said toy 1 further comprises at least one tag member 7 fixedly coupled to said body member 3, 4. In variations, said tag member 7 is substantially comprised of satin material.

V. A Method of Making a Multi-Functional, Parent-Infant-Interactive, Sensory-Stimulation Toy The disclosure in this Section V is generally directed to a method for making a multi-functional, parent-infant-interactive, sensory-stimulation toy designed to facilitate the interaction between an infant and the infant's caregiver and for causing sensory stimulation in an infant. In this Section, all reference numbers for toy components refer to those in the exemplary embodiment shown in FIGS. 1A-1L, but can be applied to other embodiments as well.

The method comprises the steps of: providing a body member 3, 4, said body member 3, 4 comprised of a fabric exterior containing a filler material 3A that renders said body member 3, 4 soft and resilient, said body member 3, 4 having a front side and a back side; and providing a flexibly stiff tail member 2 attached to the back side of said body member 3, 4, wherein: said tail member 2 extends higher than said body member 3, 4, said tail member 2 has a flexible handle member 5 disposed on one end for holding by a user, and said tail member's 2 exterior surface comprised of soft and flexible materials to present a synthetic feather-like texture.

This embodiment can be enhanced wherein the method further comprises the step of providing at least one appendage on said body member 3, 4 adapted to facilitate the ability of an average infant to grasp.

This embodiment can be enhanced wherein the method further comprises the step of providing at least one noise-making capability 3B, 3C. In variations, said at least one noise-making capability 3B, 3C is caused by a member selected from a group comprised of a mechanical bell, a jingle bell member, an internal rattle, a squeaker device, a with CPSIA-compliant crinkle material, a EN-71-compliant crinkle material, and an electronic device with speaker capable of emitting programmed sounds.

This embodiment can be enhanced wherein said tail member 2 exterior surface is substantially comprised of a fabric selected from a group comprised of satin, silk, velvet, silky shag, silky fringe, microfiber chenille. Muppet shag, thick yarn, thin yarn, fine yarn, soft cotton, and cut stretch velvet. See, e.g., FIGS. 3A-3G. In variations, other materials can be used. In other embodiments, said tail member 2 exterior surface is substantially comprised of at least one semi-plume feather.

This embodiment can be enhanced wherein the method further comprises the step of providing the toy's 1 tail member 2 with an internal spine structure 2A that is comprised of a flexibly stiff member 2A that is selected from the group consisting of a 30 Shore A silicone rubber, plastic stick, a rolled-paper stick, a foam stick, and a molded rubber stick. FIGS. 1H-1J show two examples of possible spine structures 2A, 2B. In variations, said internal spine structure 2A comprises a core spine that has a plurality of rib structures separated from each adjacent rib by a space along the longitudinal axis of said core spine, wherein said plurality of rib structures decrease in diameter size toward the top of said spine structure to form a tapered spine structure from bottom to top. (See FIGS. 1H-1I.) In still more embodiments, said spine structure 2A deviates from a straight line by incorporating at least one curvature along the length of said spine structure 2A. (See FIGS. 1H-1I.) In some variations, stuffing/filler material (e.g., polyester fill material, high-density foam, natural shredded rubber, etc.) can be used in the feather-like tail member 2 instead of, or in addition to, the internal-frame member 2A to provide the flexible stiffness needed for the feather-like tail member 2.

This embodiment can be enhanced wherein the toy's 1 materials are hypoallergenic. In variations, some or all of said toy 1 materials are organic.

This embodiment can be enhanced wherein the method further comprises the step of providing a light-emitting-diode-based (LED-based) lighting display capability.

This embodiment can be enhanced wherein said filler material 3A for said body member 3, 4 is selected from a group comprised of polyester, polyester fiberfill, polyester pellets, microbeads, polystyrene pellets, foam, down feathers, wool, natural shredded rubber, seeds, and plant matter. In variations, at least some of said filler material 3A is scented. In yet additional variations, said scented filler material 3A is interchangeable with new filler material 3A of other types or scents. In further enhancements, the method further comprises the step of providing an interchangeable scent-producing member 3A disposed in said body member 3, 4.

This embodiment can be enhanced wherein said handle member 2 is fixedly attached on each end of said handle member 2 to the rear side of said body member 3, 4.

This embodiment can be enhanced said tail member 2 is detachably coupled 8 to said body member 3, 4 such that said tail member 2 can be changed out for a different type of tail member 2 or for a differently ornamented tail member 2 or such that said tail member 2 can be used independently from the remainder of the toy 1 (similarly, the body 3, 4 of the toy 1 could be used independently from the tail member 2). In variations, said detachable coupling 8 is accomplished by a means selected from a group comprised of hook-and-loop coupling, magnetic coupling, and mechanical-snap coupling.

This embodiment can be enhanced wherein said toy 1 is aesthetically configured to resemble an animal.

This embodiment can be enhanced wherein the method further comprises the step of providing a teething ring 6, said teething ring 6 coupled to said body member 3, 4. In variations, said teething ring is detachably coupled to said body member 3, 4 to allow for the change-out with a new teething ring 6.

This embodiment can be enhanced wherein the method further comprises the step of providing at least one tag member 7 fixedly coupled to said body member 3, 4. In variations, said tag member 7 is substantially comprised of satin material.

VI. A Method of Using a Multi-Functional, Parent-Infant-Interactive, Sensory-Stimulation Toy The disclosure in this Section VI is generally directed to a method for using a multi-functional, parent-infant-interactive, sensory-stimulation toy as described in the embodiments discussed in Sections II and IV, supra. In this Section, all reference numbers for toy components refer to those in the exemplary embodiment shown in FIGS. 1A-1L and 4A-4B, but can be applied to other embodiments as well.

The method comprises the steps of: obtaining a multi-functional, parent-infant-interactive, sensory-stimulation toy according to the Embodiments described in Sections II or IV, supra; by a child-care giver; laying a baby on a substantially flat surface, preferably on a soft blanket or placing said baby in a sitting position (e.g., seated in a parent's lap, placed in a "bouncy" seat configured for a child, propped up on a pillow, etc.); holding the handle member 5 of said toy 1 and gently caress said baby's face, body, arms, hands, legs, feet, and/or belly with the tail member 2 of said toy 1; and verbally engaging with said baby while performing said holding-and-caressing step, wherein said verbal engagement includes discussing said child caregiver's actions and the introduction of new words as part of the description of the details of the activities taken by said child caregiver.

This embodiment can be enhanced wherein the method further comprises the step of: by a child caregiver, letting said baby play with and try to grasp said toy's 1 tail member 2, handle member 5, and teething ring 6.

This embodiment can be enhanced wherein the method further comprises the step of: by a child caregiver, as each of said baby's body part is named and touched with said toy's 1 tail member 2, describing how each body part is connected.

This embodiment can be enhanced wherein the method further comprises the step of: by a child caregiver, causing audio stimulation of said baby by actuating at least one of said toy's 1 noise-making capabilities 3B, 3C.

This embodiment can be enhanced wherein the method further comprises the step of: by a child caregiver, stimulating the baby's olfactory senses by altering the scent of said toy 1 by changing-out or replacing some or all of said filler 3A and/or interchangeable scent-producing member in said toy's 1 body member 3, 4.

This embodiment can be enhanced wherein the method further comprises the step of: by a child caregiver, decoupling said toy's 1 tail member 2; and attaching a new tail member to said toy 1.

This embodiment can be enhanced wherein the method further comprises the step of: by a child caregiver, decoupling said toy's 1 tail member 2; and using said tail member 2 independently from the body 3, 4 of said toy 1.

This embodiment can be enhanced wherein the method further comprises the step of: by a child caregiver, detaching said toy's 1 teething ring 6 from said toy 1; cleaning said teething ring 6; and reattaching said teething ring 6 to said toy 1.

This embodiment can be enhanced wherein the method further comprises the step of: by a child caregiver, detaching said toy's 1 teething ring 6 from said toy 1; and attaching a new teething ring 6 to said toy 1.

VII. Alternative Embodiments and Other Variations

The various embodiments and variations thereof described herein, including the descriptions in the appended claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the description and figures herein.

What is claimed is:

1. A multi-functional toy for facilitating the interaction between an infant and the infant's caregiver and for causing sensory stimulation in an infant, the toy comprising:
    a body member, said body member comprised of a fabric exterior containing a filler material that renders said body member soft and resilient, said body member having a front side and a back side;
    a flexibly stiff tail member attached to the back side of said body member, wherein:
        said tail member extends higher than said body member,
        said tail member is flexible when external force is applied, but substantially returns to its original position when said external force is removed, and
        said tail member's exterior surface comprised of soft and flexible materials to present a synthetic feather-like texture; and
    a flexible handle member disposed between the end of said tail member that is proximal to said body member and the end of said body member that is distal from said tail member, for holding by a user.

2. The toy of claim 1, further comprising at least one appendage on said body member adapted to facilitate the ability of an average infant to grasp.

3. The toy of claim 1, further comprising at least one noise-making capability.

4. The toy of claim 3, wherein said at least one noise-making capability is caused by a member selected from the group consisting of a mechanical bell, a jingle bell member, an internal rattle, a squeaker device, with a CPSIA-compliant crinkle material, an EN-71-compliant crinkle material, and an electronic device with speaker capable of emitting programmed sounds.

5. The toy of claim 1, wherein said tail member exterior surface is comprised of a fabric selected from the group consisting of satin, silk, velvet, silky shag, silky fringe, microfiber chenille, Muppet shag, thick yarn, thin yarn, fine yarn, soft cotton, and cut stretch velvet.

6. The toy of claim 5, wherein said tail member is further comprised of filler material selected from the group consisting of polyester, polyester fiberfill, polyester pellets, microbeads, polystyrene pellets, high-density foam, wool, and natural shredded rubber.

7. The toy of claim 1, wherein said tail member exterior surface is comprised of at least one semi-plume feather.

8. The toy of claim 1, wherein said tail member has an internal spine structure that is comprised of a flexibly stiff member that is selected from the group consisting of a 30 Shore A silicone rubber, plastic stick, a rolled-paper stick, a foam stick, and a molded rubber stick.

9. The toy of claim 8, wherein said internal spine structure comprises a core spine that has a plurality of rib structures, each of said plurality of rib structures separated from adjacent rib structures by a space along the longitudinal axis of said core spine, wherein said plurality of rib structures decrease in diameter size toward the top of said spine structure to form a tapered spine structure from bottom to top.

10. The toy of claim 8 or claim 9, wherein said spine structure deviates from a straight line by incorporating at least one curvature along the length of said spine structure.

11. The toy of claim 1, wherein all materials comprising the toy are hypoallergenic.

12. The toy of claim 1, wherein all materials comprising the toy are organic.

13. The toy of claim 1, wherein said filler material in said body member is selected from the group consisting of polyester, polyester fiberfill, polyester pellets, microbeads, polystyrene pellets, foam, down feathers, wool, natural shredded rubber, seeds, and plant matter.

14. The toy of claim 1, further comprising filler material that is scented.

15. The toy of claim 14, wherein said scented filler material is interchangeable with new filler material of other types or scents.

16. The toy of claim 15, further comprising an interchangeable scent-producing member disposed in said body member.

17. The toy of claim 1, wherein said handle member is fixedly attached on each end of said handle member to the rear side of said body member.

18. The toy of claim 1, wherein said tail member is detachably coupled to said body member such that said tail member can be changed out for a different type of tail member or for a differently ornamented tail member or such that said tail member and said body member can be used independently from each other.

19. The toy of claim 18, wherein said detachable coupling is accomplished by a means selected from the group consisting of hook-and-loop coupling, magnetic coupling, and mechanical-snap coupling.

20. The toy of claim 1, wherein said toy is aesthetically configured to resemble an animal.

21. The toy of claim 1, further comprising a teething ring, said teething ring coupled to said body member.

22. The toy of claim 21, wherein said teething ring is detachably coupled to said body member to allow for the change-out with a new teething ring.

23. The toy of claim 1, further comprising at least one tag member fixedly coupled to said body member.

24. The toy of claim 23, wherein said tag member is comprised of satin material.

* * * * *